US012671842B2

(12) United States Patent
Choi et al.

(10) Patent No.: US 12,671,842 B2
(45) Date of Patent: *Jun. 30, 2026

(54) SIGNALING OF INTER LAYER PREDICTION IN VIDEO BITSTREAM

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/744,515

(22) Filed: Jun. 14, 2024

(65) Prior Publication Data

US 2025/0386030 A1 Dec. 18, 2025

Related U.S. Application Data

(63) Continuation of application No. 17/857,606, filed on Jul. 5, 2022, now Pat. No. 12,052,441, which is a
(Continued)

(51) Int. Cl.
*H04N 19/70* (2014.01)
*H04N 19/105* (2014.01)
(Continued)

(52) U.S. Cl.
CPC .......... *H04N 19/70* (2014.11); *H04N 19/105* (2014.11); *H04N 19/159* (2014.11);
(Continued)

(58) Field of Classification Search
CPC ...... H04N 19/30; H04N 19/172; H04N 19/46; H04N 19/187; H04N 19/70; H04N 19/157; H04N 19/31; H04N 19/105
(Continued)

(56) References Cited

U.S. PATENT DOCUMENTS 9,992,493 B2 * 6/2018 Chen .................... H04N 19/593
2009/0213938 A1 8/2009 Lee et al.
(Continued)

FOREIGN PATENT DOCUMENTS

JP 2010226376 A 10/2010
WO WO 2014168799 A1 10/2014
WO WO 2018002425 A2 1/2018

OTHER PUBLICATIONS

Tencent Technology, Singaporean Written Opinion, SG Patent Application No. 11202110106T, Apr. 24, 2025, 3 pgs.
(Continued)

*Primary Examiner* — Marnie A Matt
(74) *Attorney, Agent, or Firm* — Morgan, Lewis & Bockius LLP

(57) ABSTRACT

An example method of video decoding includes receiving a scalable bitstream including a first layer and determining whether the first layer is a dependent layer of the scalable bitstream based at least in part on a syntax element from the scalable bitstream. When the first layer is the dependent layer, a picture in the dependent layer is decoded based on an inter-layer reference picture (ILRP) list, wherein a size of the ILRP corresponds to a number of direct reference layers indicated in the scalable bitstream. When the first layer is not the dependent layer, the picture in the first layer is decoded without using the ILRP list.

20 Claims, 10 Drawing Sheets

Related U.S. Application Data continuation of application No. 17/019,713, filed on Sep. 14, 2020, now Pat. No. 11,418,813.

(60) Provisional application No. 62/903,652, filed on Sep. 20, 2019.

(51) Int. Cl.

| | |
|---|---|
| *H04N 19/159* | (2014.01) |
| *H04N 19/172* | (2014.01) |
| *H04N 19/30* | (2014.01) |
| *H04N 19/31* | (2014.01) |
| *H04N 19/46* | (2014.01) |

(52) U.S. Cl.
CPC .......... *H04N 19/172* (2014.11); *H04N 19/30* (2014.11); *H04N 19/31* (2014.11); *H04N 19/46* (2014.11)

(58) Field of Classification Search
USPC ...................................................... 375/240.12
See application file for complete search history.

(56) References Cited

U.S. PATENT DOCUMENTS

| | | | |
|---|---|---|---|
| 2010/0241920 A1 | 9/2010 | Nonogaki | |
| 2014/0010291 A1 | 1/2014 | He et al. | |
| 2014/0218473 A1 | 8/2014 | Hannuksela et al. | |
| 2014/0294062 A1* | 10/2014 | Chen .................... | H04N 19/503 |
| | | | 375/240.02 |
| 2014/0294063 A1 | 10/2014 | Chen et al. | |
| 2014/0301456 A1 | 10/2014 | Wang et al. | |
| 2014/0314148 A1 | 10/2014 | Lainema et al. | |
| 2014/0362910 A1 | 12/2014 | Seregin et al. | |
| 2015/0319453 A1 | 11/2015 | Kang et al. | |
| 2016/0191933 A1 | 6/2016 | Ikai et al. | |
| 2016/0227232 A1 | 8/2016 | Choi et al. | |
| 2016/0241869 A1 | 8/2016 | Choi et al. | |
| 2021/0092358 A1 | 3/2021 | Choi et al. | |
| 2022/0312042 A1* | 9/2022 | Deshpande ............ | H04N 19/70 |
| 2022/0345745 A1 | 10/2022 | Deshpande | |
| 2022/0353537 A1* | 11/2022 | Deshpande .......... | H04N 19/119 |
| 2025/0220245 A1* | 7/2025 | Deshpande .......... | H04N 19/172 |

OTHER PUBLICATIONS

Tencent Technology, ISR/WO, PCT/US2020/051479, Dec. 31, 2020, 10 pgs.
Tencent Technology, Indian Office Action, IN Patent Application No. 202137043257, Apr. 28, 2022, 5 pgs.
Tencent Technology, Japanese Office Action, JP Patent Application No. 2021-549117, Aug. 8, 2022, 8 pgs.
Tencent Technology, Extended European Search Report, EP Patent Application No. 20864585.3, Jun. 6, 2023, 15 pgs.
Tencent Technology, Australian Office Action, AU Patent Application No. 2023202413, Nov. 28, 2023, 2 pgs.
Tencent Technology, Korean Office Action, KR Patent Application No. 10-2021-7026019, Jul. 19, 2024, 12 pgs.
Benjamin Bross et al., "Versatile Video Coding (Draft 6)", Document: JVET-O2001-v9, Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pgs.
Benjamin Bross et al., "Versatile Video Coding (Draft 7)", Document: JVET-P2001-v9, Joint Video Experts Team (JVET) of ITU-T SG 16 WP 3 and ISO/IEC JTC 1/SC 29/WG 11, 16th Meeting, Geneva, CH, Oct. 1-11, 2019, 491 pgs.
Byeongdoo Choi et al., "AHG8: On Signaling Interlayer Reference Picture List", Document: JVET-P0221-v2, Joint Video Experts Team (JVET) of ITU-T SG 16 WP 3 and ISO/IEC JTC 1/SC 29/WG 11, 16th Meeting: Geneva, CH, Oct. 1-11, 2019, 3 pgs.
Glenn Van Wallendael et al., "Description of Scalable Video Coding Technology Proposal by Ghent University—IBBT", Document: JCTVC-K0049, Joint Collaborative Team on Video Coding, JTC-VC of ITU-T SG16 WP3, and ISO/IEC JTC1/SC29/WG11, 11th Meeting: Shanghai, CN, Oct. 10-19, 2012, 18 pgs.
Jianle Chen et al., "High Efficiency Video Coding (HEVC) Scalable Extensions Draft 5", Document: JCTVC-P1008_v4, Joint Collaborative Team on Video Coding (JCT-VC) of ITU-T SG 16 WP 3 and ISO/IEC JTC 1/SC 29/1/VG 11, 16th Meeting, Jan. 9-17, 2014, 24 pgs.
Zhu Xiuchang et al., "H.265/HEVC—New Video Coding Standard and it's Extensions", Publishing House of Electronics Industry, Retrieved from the Internet: https://phei.com.cn/module/goods/wssd_content.jsp?bookid=46750., ISBN No. 9787121290381, Jul. 2016, 19 pgs.
Tencent Technology, European Office Action, EP Patent Application No. 20864585.3, Sep. 22, 2025, 12 pgs.

* cited by examiner

FIG. 6

| | Descriptor |
|---|---|
| tile_group_header( ){ | |
| … | |
| if(adaptive_pic_resolution_change_flag){ | |
| dec_pic_size_idx | u(1) |
| } | |
| … | |
| } | |

| | Descriptor |
|---|---|
| seq_parameter_set_rbsp( ) { | |
| … | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++){ | |
| dec_pic_width_in_luma_samples[i] | ue(v) |
| dec_pic_height_in_luma_samples[i] | ue(v) |
| } | |
| … | |
| } | |

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus 1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     ... | |
|     } | |
|   if( vps_max_layers_minus1 > 0 && !vps_all_independent_layers_flag ) { | |
|     vps_output_layers_mode | u(2) |
|     if( vps_output_layers_mode == 2 ) | |
|       for( i = 0; i < vps_max_layers_minus1; i++ ) | |
|         vps_output_layer_flag[ i ] | u(1) |
|     ... | |
|     } | |
|   vps_constraint_info_present_flag | u(1) |
|   vps_reserved_zero_7bits | u(7) |
|   if( vps_constraint_info_present_flag ) | |
|     general_constraint_info( ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
|   ... | |

| seq_parameter_set_rbsp() { | Descriptor |
|---|---|
| ... | |
| inter_layer_ref_pics_present_flag | u(1) |
| ... | |
| } | |

FIG. 9

| | Descriptor |
|---|---|
| ref_pic_list_struct( listIdx, rplsIdx ) { | |
| num_ref_entries[ listIdx ][ rplsIdx ] | ue(v) |
| if( long_term_ref_pics_flag) | |
| ltrp_in_slice_header_flag[ listIdx ][ rplsIdc ] | u(1) |
| for( i = 0, j = 0; i < num_ref_entries [ listIdx ][ rplsIdx ]; i++ | |
| if( inter_layer_ref_pics_present_flag ) | |
| inter_layer_ref_pic_flag[ listIdx ][ rplsIdx][ i ] | |
| if( !inter_layer_ref_pics_flag[ listIdx ][ rplsIdx][ i ]){ | |
| if( long_term_ref_pics_flag ) | |
| st_ref_pic_flag[ listIdx ][ rplsIdx ][ i ] | u(1) |
| if( st_ref_pic_flag[ listIdx ][ rplsIdx ][ i ]){ | |
| abs_delta_poc_st[ listIdx ][ rplsIdx][ i ] | ue(v) |
| if( AbsDeltaPocSt[ listIdx ][ rplsIdx ][ i ]>0) | |
| strp_entry_sign_flag[ listIdx ][ rplsIdx ][ i ] | u(1) |
| } else if( !ltrp_in_slice_header_flag[ listIdx ][ rplsIdx ]) | |
| rpls_poc_lsb_lt[ listIdx ][ rplsIdx ][ i++ ] | u(v) |
| } else | |
| iltrp_idc[ listIdx ][ rplsIdx ][ i ] | ue(v) |

SIGNALING OF INTER LAYER PREDICTION IN VIDEO BITSTREAM

CROSS REFERENCE TO RELATED APPLICATION

This application is a continuation of U.S. application Ser. No. 17/857,606 filed Jul. 5, 2022, which is a continuation of U.S. application Ser. No. 17/019,713 filed Sep. 14, 2020, which claims priority to provisional application U.S. 62/903, 652 filed on Sep. 20, 2019, each of which are hereby expressly incorporated by reference, in their entirety, into the present application.

BACKGROUND

1. Field

The disclosed subject matter relates to video coding and decoding, and more specifically, to the signaling of inter-layer prediction in video bitstream.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture time-frame. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling (RPR) and change of resolution for a whole picture. Similarly, certain proposals made towards VVC (including, for example, Hendry, et. al, "On adaptive resolution change (ARC) for VVC", Joint Video Team document JVET-M0135-v1, Jan. 9-19, 2019, incorporated herein in its entirety) allow for resampling of whole reference pictures to different—higher or lower—resolutions. In that document, different candidate resolutions are suggested to be coded in the sequence parameter set and referred to by per-picture syntax elements in the picture parameter set.

SUMMARY

To address one or more different technical problems, this disclosure described new syntaxes and use thereof designed for signaling of scaling in a video bitstream. Thus, improved (de) coding efficiency can be achieved.

According to embodiments herein, with Reference Picture Resampling (RPR) or Adaptive Resolution Change (ARC), the additional burden for scalability support is may be achieved by a modification of the high-level syntax (HLS). In technical aspects, the inter-layer prediction is employed in a scalable system to improve the coding efficiency of the enhancement layers. In addition to the spatial and temporal motion-compensated predictions that are available in a single-layer codec, the inter-layer prediction uses the resampled video data of the reconstructed reference picture from a reference layer to predict the current enhancement layer. Then, the resampling process for inter-layer prediction is performed at the block-level, by modifying the existing interpolation process for motion compensation. It means that no additional resampling process is needed to support scalability. In this disclosure, high-level syntax elements to support spatial/quality scalability using the RPR are disclosed.

There is included a method and apparatus comprising memory configured to store computer program code and a processor or processors configured to access the computer program code and operate as instructed by the computer program code. The computer program code includes parsing code configured to cause the at least one processor to parse at least one video parameter set (VPS) comprising at least one syntax element indicating whether at least one layer in the scalable bitstream is one of a dependent layer of the scalable bitstream and an independent layer of the scalable bitstream, determining code configured to cause the at least one processor to determine a number of dependent layers, including the dependent layer, of the scalable bitstream based on a plurality of flags included in the VPS, first decoding code configured to cause the at least one processor to decode a picture in the dependent layer by parsing and interpreting an inter-layer reference picture (ILRP) list, and second decoding code configured to cause the at least one processor to decode a picture in an independent layer without parsing and interpreting the ILRP list.

According to embodiments, the second decoding code is further configured to cause the at least one processor to decode the picture in the independent layer by parsing and interpreting a reference picture list which does not include any decoded picture of another layer.

According to embodiments, the inter-layer reference picture list includes a decoded picture of the other layer.

According to embodiments, the parsing code is further configured to cause the at least one processor to parse the at least one VPS by determining whether another syntax element indicates a maximum number of layers.

According to embodiments, the parsing code is further configured to cause the at least one processor to parse the at least one VPS by determining whether the VPS comprises a flag indicating whether another layer in the scalable bit-stream is a reference layer for the at least one layer.

According to embodiments, the parsing code is further configured to cause the at least one processor to parse the at least one VPS by determining whether the flag indicates the other layer as the reference layer for the at least one layer by specifying an index of the other layer and an index of the at least one layer, and the parsing code is further configured to cause the at least one processor to parse the at least one VPS by determining whether the VPS comprises another syntax element indicating a value less than the determined number of dependent layers.

According to embodiments, the parsing code is further configured to cause the at least one processor to parse the at least one VPS by determining whether the flag indicates the other layer as not being the reference layer for the at least one layer by specifying an index of the other layer and an index of the at least one layer, and the parsing code is further configured to cause the at least one processor to parse the at least one VPS by determining whether the VPS comprises another syntax element indicating a value less than the determined number of dependent layers.

According to embodiments, the parsing code is further configured to cause the at least one processor to parse the at least one VPS by determining whether the VPS comprises a flag indicating whether a plurality of layers, including the at least one layer, are to be decoded by interpreting the ILRP list.

According to embodiments, the parsing code is further configured to cause the at least one processor to parse the at least one VPS by determining whether the VPS comprises a flag indicating whether a plurality of layers, including the at least one layer, are to be decoded without interpreting the ILRP list.

According to embodiments, the parsing code is further configured to cause the at least one processor to parse the at least one VPS further comprises determining whether the VPS comprises a flag indicating whether a plurality of layers, including the at least one layer, are to be decoded by interpreting the ILRP list.

BRIEF DESCRIPTION OF THE DRAWINGS

Further features, the nature, and various advantages of the disclosed subject matter will be more apparent from the following detailed description and the accompanying drawings in which:

FIG. 6 is a schematic illustration of signaling picture resolutions in accordance with embodiments.

FIG. 7 is a schematic illustration of signaling picture size and conformance window in SPS in accordance with embodiments.

FIG. 8 is a schematic illustration of signaling inter-layer prediction presence in SPS in accordance with embodiments.

FIG. 9 is a schematic illustration of signaling inter-layer prediction index in slice header in accordance with embodiments.

FIG. 10 is a schematic illustration of a computer system in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
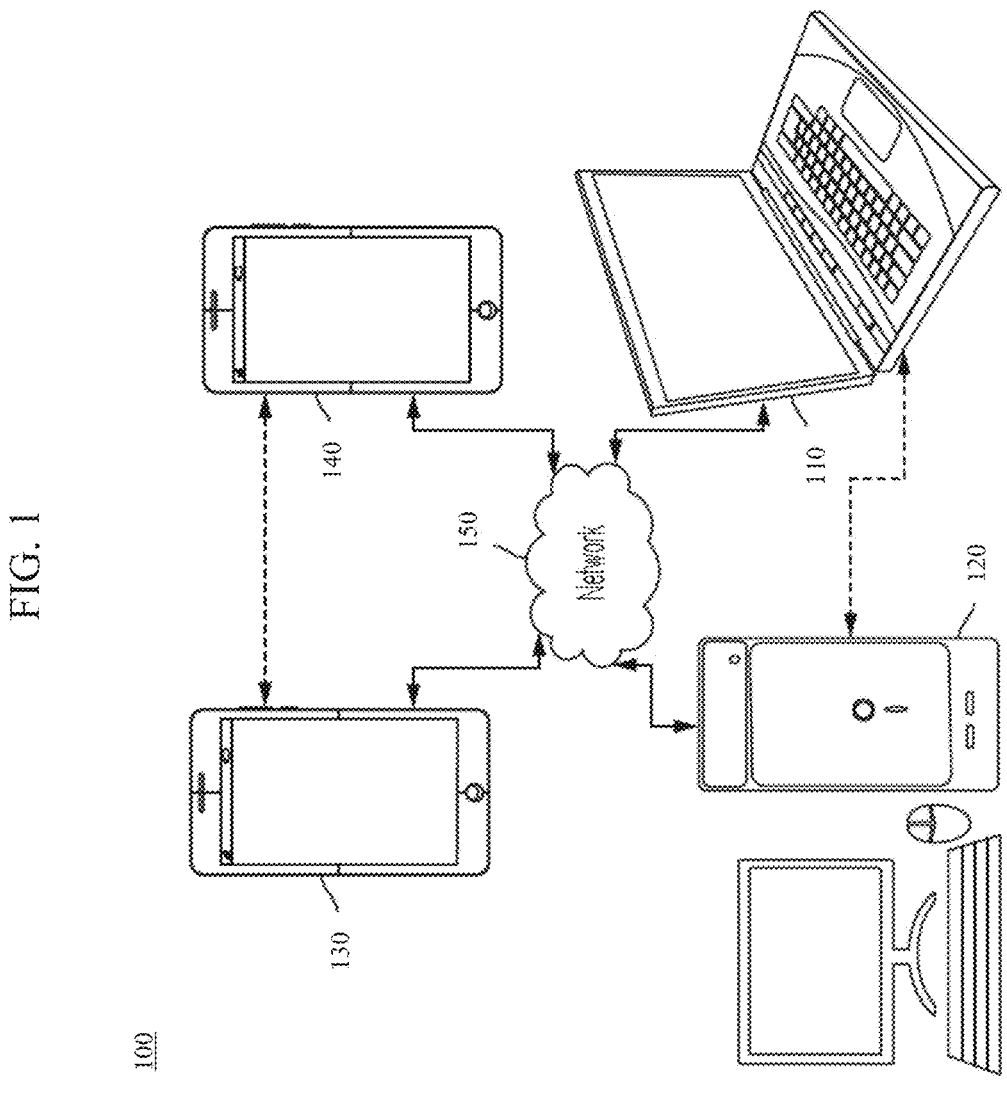
FIG. 1 is a schematic illustration of a simplified block diagram of a communication system in accordance with embodiment.

FIG. 1 illustrates a simplified block diagram of a communication system (100) according to an embodiment of the present disclosure. The system (100) may include at least two terminals (110 and 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110, 120, 130, 140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110, 120, 130, 140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
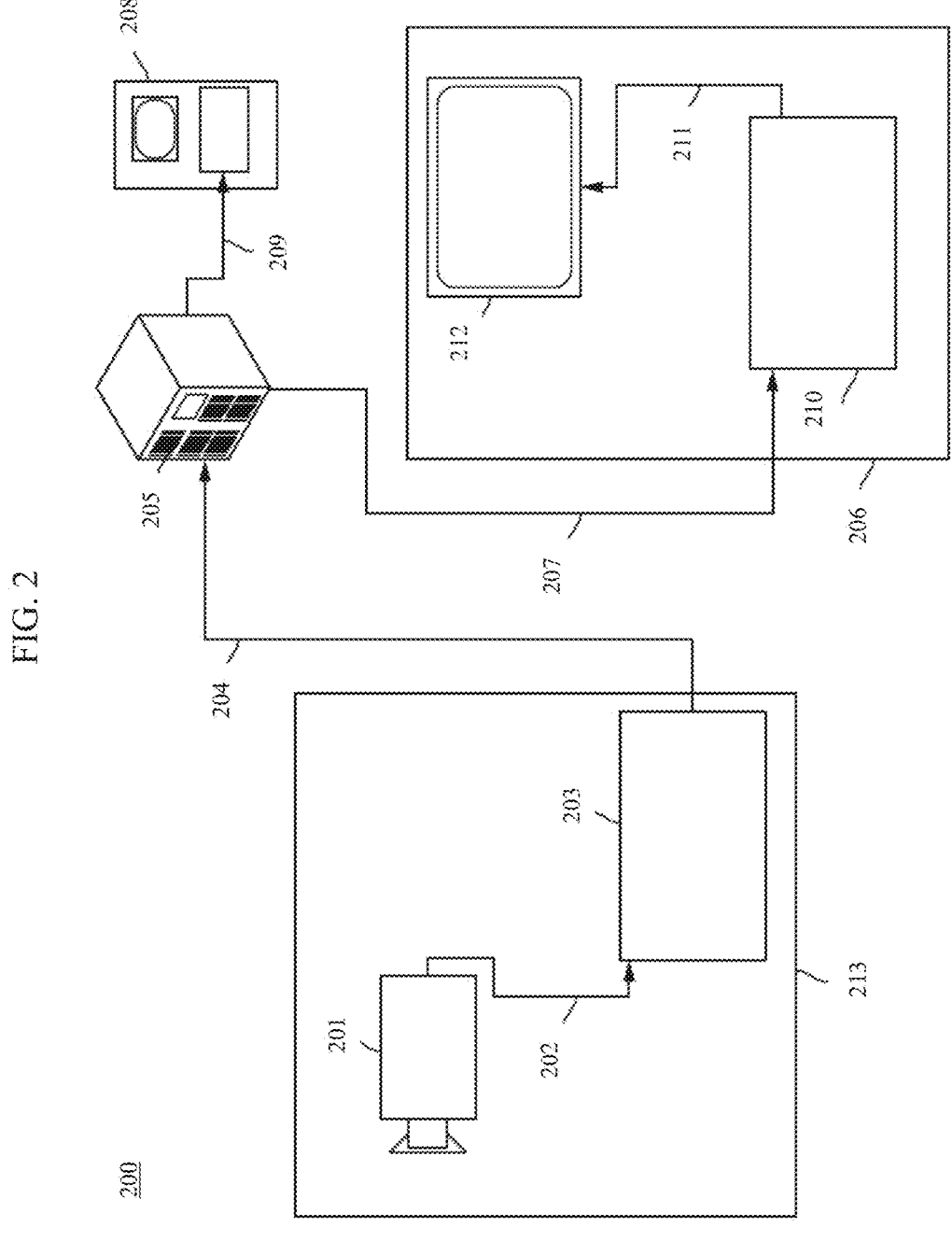
FIG. 2 is a schematic illustration of a simplified block diagram of a communication system in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
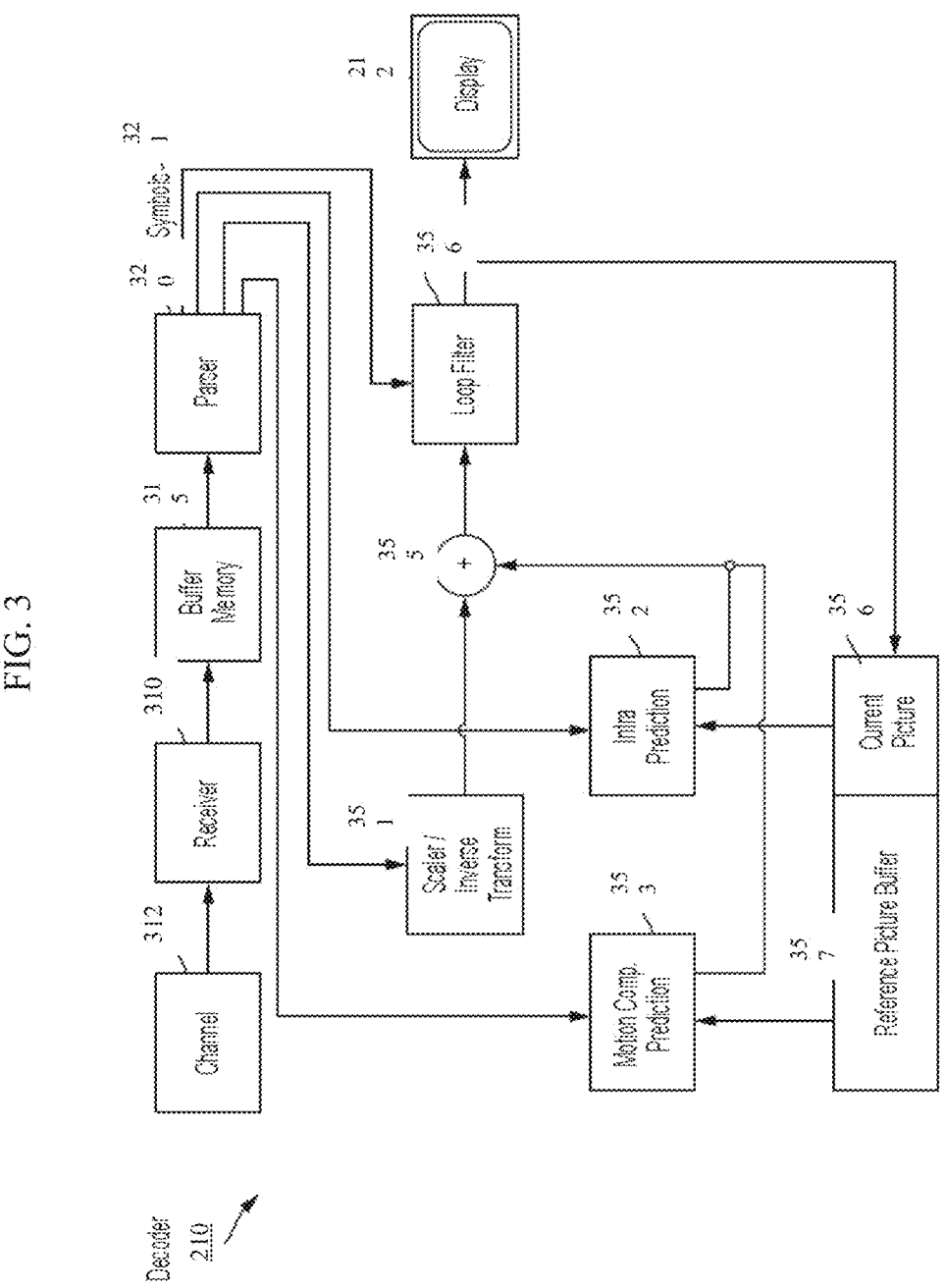
FIG. 3 is a schematic illustration of a simplified block diagram of a decoder in accordance with embodiments.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
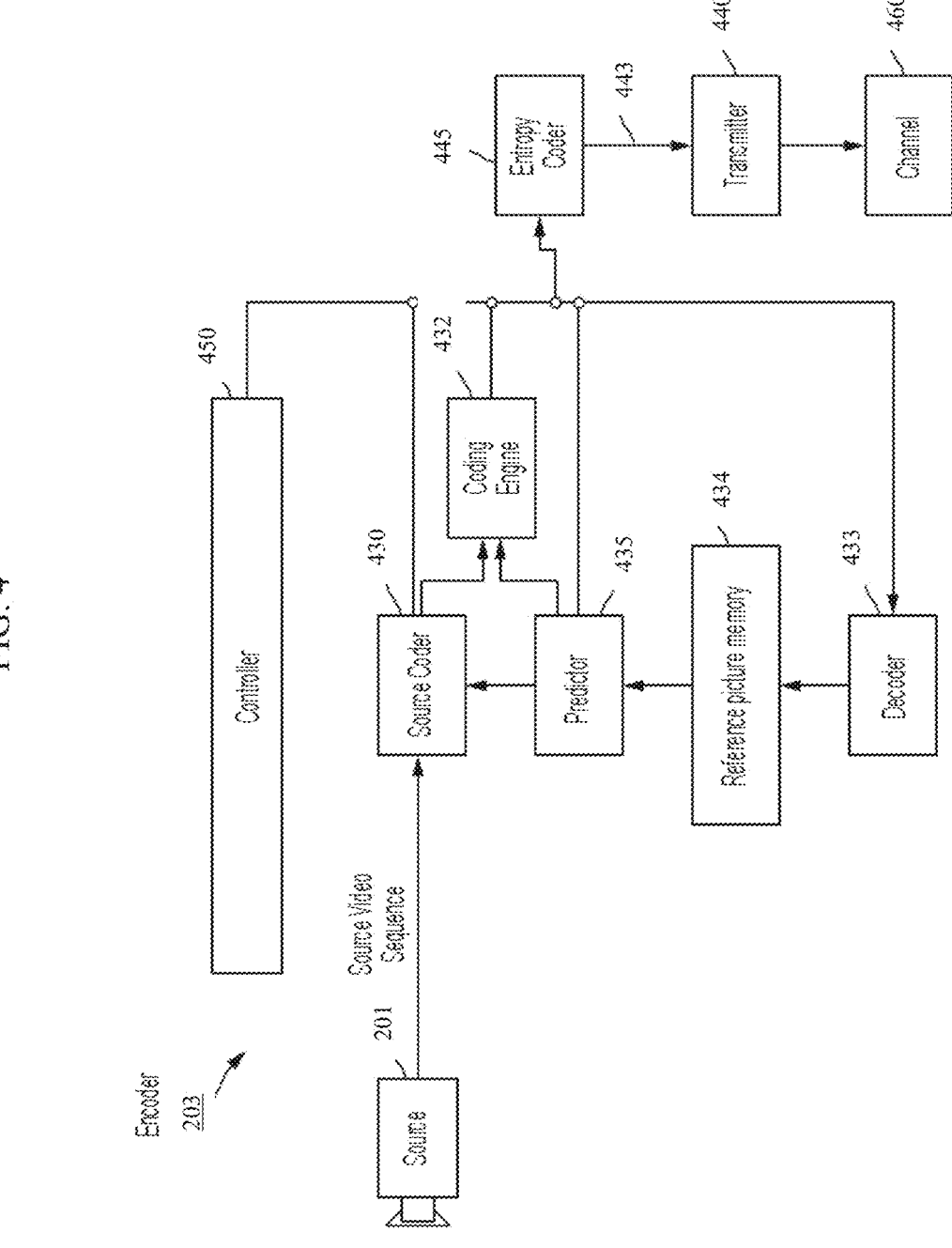
FIG. 4 is a schematic illustration of a simplified block diagram of an encoder in accordance with embodiments.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of the disclosed subject matter in more detail, a few terms need to be introduced that will be referred to in the remainder of this description.

Sub-Picture henceforth refers to an, in some cases, rectangular arrangement of samples, blocks, macroblocks, coding units, or similar entities that are semantically grouped, and that may be independently coded in changed resolution. One or more sub-pictures may for a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

Reference Picture Resampling (RPR) or Adaptive Resolution Change (ARC) henceforth refers to mechanisms that allow the change of resolution of a picture or sub-picture within a coded video sequence, by the means of, for example, reference picture resampling. RPR/ARC parameters henceforth refer to the control information required to perform adaptive resolution change, that may include, for example, filter parameters, scaling factors, resolutions of output and/or reference pictures, various control flags, and so forth.

Above description is focused on coding and decoding a single, semantically independent coded video picture. Before describing the implication of coding/decoding of multiple sub pictures with independent RPR/ARC parameters and its implied additional complexity, options for signaling RPR/ARC parameters shall be described.

Referring to FIG. 5, shown are several novel options for signaling RPR/ARC parameters. As noted with each of the options, they have certain advantages and certain disadvantages from a coding efficiency, complexity, and architecture viewpoint. A video coding standard or technology may choose one or more of these options, or options known from previous art, for signaling RPR/ARC parameters. The options may not be mutually exclusive, and conceivably may be interchanged based on application needs, standards technology involved, or encoder's choice.

Classes of RPR/ARC parameters may include:
up/downsample factors, separate or combined in X and Y dimension,
up/downsample factors, with an addition of a temporal dimension, indicating constant speed zoom in/out for a given number of pictures,
any of the above two may involve the coding of one or more presumably short syntax elements that may point into a table containing the factor(s),
resolution, in X or Y dimension, in units of samples, blocks, macroblocks, CUs, or any other suitable granularity, of the input picture, output picture, reference picture, coded picture, combined or separately (If there are more than one resolution (such as, for example, one for input picture, one for reference picture) then, in certain cases, one set of values may be inferred to from another set of values. Such could be gated, for example, by the use of flags. For a more detailed example, see below.), "warping" coordinates akin those used in H.263 Annex P, again in a suitable granularity as described above. (H.263 Annex P defines one efficient way to code such warping coordinates, but other, potentially more efficient ways are conceivably also devised. For example, according to embodiments the variable length reversible, "Huffman"-style coding of warping coordinates of Annex P is replaced by a suitable length binary coding, where the length of the binary code word could, for example, be derived from a maximum picture size, possibly multiplied by a certain factor and offset by a certain value, so to allow for "warping" outside of the maximum picture size's boundaries), and/or up or downsample filter parameters (In the easiest case, there may be only a single filter for up and/or downsampling. However, in certain cases, it can be advantageous to allow more flexibility in filter design, and that may require to signaling of filter parameters. Such parameters may be selected through an index in a list of possible filter designs, the filter may be fully specified (for example through a list of filter coefficients, using suitable entropy coding techniques), the filter may be implicitly selected through up/downsample ratios according to which in turn are signaled according to any of the mechanisms mentioned above, and so forth).

Henceforth, the description assumes the coding of a finite set of up/downsample factors (the same factor to be used in both X and Y dimension), indicated through a codeword. That codeword can advantageously be variable length coded, for example using the Ext-Golomb code common for certain syntax elements in video coding specifications such as H.264 and H.265. One suitable mapping of values to up/downsample factors can, for example, be according to the following table 1:

TABLE 1

| Codeword | Ext-Golomb Code | Original/Target resolution |
|---|---|---|
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes, for example using binary coding. That may have certain advantages when the resampling factors were of interest outside the video processing engines (encoder and decoder foremost) themselves, for example by MANEs. It should be noted that, for the (presumably) most common case where no resolution change is required, an Ext-Golomb code can be chosen that is short; in the table above, only a single bit. That can have a coding efficiency advantage over using binary codes for the most common case.

The number of entries in the table, as well as their semantics may be fully or partially configurable. For example, the basic outline of the table may be conveyed in a "high" parameter set such as a sequence or decoder parameter set. Alternatively or in addition, one or more such tables may be defined in a video coding technology or standard, and may be selected through for example a decoder or sequence parameter set.

Henceforth, we describe how an upsample/downsample factor (ARC information), coded as described above, may be included in a video coding technology or standard syntax. Similar considerations may apply to one, or a few, code-words controlling up/downsample filters. See below for a discussion when comparatively large amounts of data are required for a filter or other data structures.

Figures 5A, 5B, 5C, 5D, 5E:
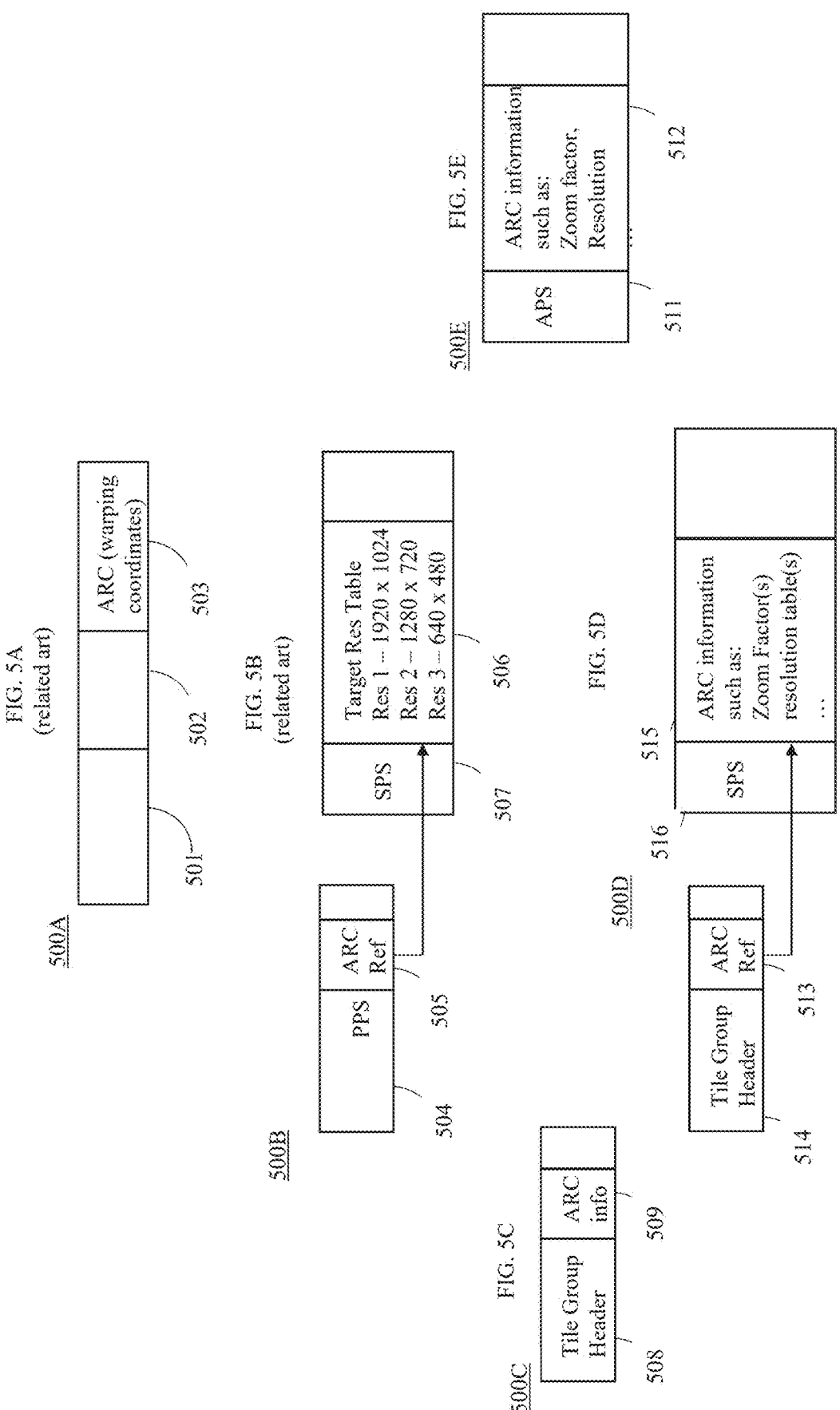
FIG. 5A is a schematic illustration of options for signaling ARC/RPR parameters in accordance with related art.
FIG. 5B is a schematic illustration of options for signaling ARC/RPR parameters in accordance with related art.
FIG. 5C is a schematic illustration of options for signaling ARC/RPR parameters in accordance with embodiments.
FIG. 5D is a schematic illustration of options for signaling ARC/RPR parameters in accordance with embodiments.
FIG. 5E is a schematic illustration of options for signaling ARC/RPR parameters in accordance with embodiments.

As shown in the example of FIG. 5A, the illustration (500A) shows that H.263 Annex P includes the ARC information (502) in the form of four warping coordinates into the picture header (501), specifically in the H.263 PLUSP-TYPE (503) header extension. This can be a sensible design choice when a) there is a picture header available, and b) frequent changes of the ARC information are expected. However, the overhead when using H.263-style signaling can be quite high, and scaling factors may not pertain among picture boundaries as picture header can be of transient nature. Further, as shown in the example of FIG. 5B, the illustration (500B) shows that JVET-M0135 includes PPS information (504), ARC ref information (505), SPS information (507), and Target Res Table information (506).

According to exemplary embodiments, FIG. 5C illustrates example (500C) in which there is shown tile group header information (508) and ARC information (509); FIG. 5D illustrates example (500D) in which there is shown a tile group header information (514), an ARC ref information (513), SPS information (516) and ARC information (515), and FIG. 5E illustrates example (500E) in which there is shown adaptation parameter set(s) (APS) information (511) and ARC information (512).

FIG. 6 illustrates the table example (600) wherein adaptive resolution is in use, in this example, coded is an output resolution in units of samples (613). The numeral 613 refers to both output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of those two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons, as would be understood by one of ordinary skill in the art in view of the present disclosure.

In certain applications, it can be advisable that the encoder instructs the decoder to use a certain reference picture size rather than implicitly assume that size to be the output picture size. In this example, the syntax element reference_pic_size_present_flag (614) gates the conditional presence of reference picture dimensions (615) (again, the numeral refers to both width and height).

Certain video coding technologies or standards, for example VP9, support spatial scalability by implementing certain forms of reference picture resampling (signaled quite differently from the disclosed subject matter) in conjunction with temporal scalability, so to enable spatial scalability. In particular, certain reference pictures may be upsampled using ARC-style technologies to a higher resolution to form the base of a spatial enhancement layer. Those upsampled pictures could be refined, using normal prediction mechanisms at the high resolution, so to add detail.

The disclosed subject matter can be and is used in such an environment according to embodiments. In certain cases, in the same or another embodiment, a value in the NAL unit header, for example the Temporal ID field, can be used to indicate not only the temporal but also the spatial layer. Doing so has certain advantages for certain system designs; for example, existing Selected Forwarding Units (SFU) created and optimized for temporal layer selected forwarding based on the NAL unit header Temporal ID value can be used without modification, for scalable environments. In order to enable that, there may be a requirement for a mapping between the coded picture size and the temporal layer is indicated by the temporal ID field in the NAL unit header.

In embodiments, the information on inter-layer dependency may be signaled in VPS (or DPS, SPS, or SEI message). The inter-layer dependency information may be used to identify which layer is used as a reference layer to decode the current layer. A decoded picture picA in a direct dependent layer with nuh_layer_id equal to m may be used as a reference picture of the picture picB with nuh_layer_id equal to n, when n is greater than m and two pictures picA and picB belong to the same access unit.

In the same or other embodiments, the inter-layer reference picture (ILRP) list may be explicitly signaled with the inter-prediction reference picture (IPRP) list in a slice header (or a parameter set). Both ILRP lists and IPRP lists may be used for construction of the forward and backward prediction reference picture lists.

In the same or other embodiments, syntax elements in VPS (or other parameter set) may indicate whether each layer is dependent or independent. Referring to the example (700) in FIG. 7, the syntax element vps_max_layers_minus1 (703) plus 1 may specify the maximum number of layers allowed in one or more, potentially all, CVS referring to the VPS (701). vps_all_independent_layers_flag (704) equal to 1 may specify that all layers in the CVS are independently coded, i.e. without using inter-layer prediction. vps_all_independent_layers_flag (704) equal to 0 may specify that one or more of the layers in the CVS may use inter-layer prediction. When not present, the value of vps_all_independent_layers_flag may be inferred to be equal to 1. When vps_all_independent_layers_flag is equal to 1, the value of vps_independent_layer_flag[i] (706) may be inferred to be equal to 1. When vps_all_independent_layers_flag is equal to 0, the value of vps_independent_layer_flag[0] is inferred to be equal to 1.

Referring to FIG. 7, vps_independent_layer_flag[i] (706) equal to 1 may specify that the layer with index i does not use inter-layer prediction. vps_independent_layer_flag[i] equal to 0 may specify that the layer with index i may use inter-layer prediction and vps_layer_dependency_flag[i] is present in VPS. vps_direct_dependency_flag[i][j] (707) equal to 0 may specify that the layer with index j is not a direct reference layer for the layer with index i. vps_direct_dependency_flag[i][j] equal to 1 may specify that the layer with index j is a direct reference layer for the layer with index i. When vps_direct_dependency_flag[i][j] is not present for i and j in the range of 0 to vps_max_layers_minus1, inclusive, it may be inferred to be equal to 0.

The variable DirectDependentLayerIdx[i][j], specifying the j-th direct dependent layer of the i-th layer, and the variable NumDependentLayers[i], specifying the number of dependent layers of the i-th layer, are derived as follows:

```
for( i = 1; i < vps_max_layers_minus1; i-- )
  if( !vps_independent_layer_flag[ i ] ) {
    for( j = i, k = 0; j >= 0; j-- )
      if( vps_direct_dependency_flag[ i ][ j ] )
        DirectDependentLayerIdx[ i ][ k++ ] = j
    NumDependentLayers[ i ] = k
  }
```

In the same or another embodiment, referring to FIG. 7, when vps_max_layers_minus1 is greater than zero and the value of vps_all_independent_layers_flag is equal to zero, vps_output_layers_mode and vps_output_layer_flags[i] may be signalled. vps_output_layers_mode (708) equal to 0 may specify that only the highest layer is output. vps_output_layer_mode equal to 1 specifies that all layers may be output. vps_output_layer_mode equal to 2 may specify that the layers that are output are the layers with vps_output_layer_flag[i] (709) equal to 1. The value of vps_output_layers_mode shall be in the range of 0 to 2, inclusive. The value 3 of vps_output_layer_mode may be reserved for future use. When not present, the value of vps_output_layers_mode may be inferred to be equal to 1. vps_output_layer_flag[i] equal to 1 may specify that the i-th layer is output. vps_output_layer_flag[i] equal to 0 may specify that the i-th layer is not output. The list OutputLayerFlag[i], for which the value 1 may specify that the i-th layer is output and the value 0 specified that the i-th layer is not output, is derived as follows:

```
OutputLayerFlag[ vps_max_layers_minus1 ] = 1
for( i = 0; i < vps_max_layers_minus1; i++ )
  if( vps_output_layer_mode == 0 )
    OutputLayerFlag[ i ] = 0
  else if( vps_output_layer_mode == 1 )
    OutputLayerFlag[ i ] = 1
  else if( vps_output_layer_mode == 2 )
    OutputLayerFlag[ i ] = vps_output_layer_flag[ i ]
```

In the same or another embodiment, the output of the current picture may be specified as follows:

If PictureOutputFlag is equal to 1 and DpbOutputTime[n] is equal to CpbRemovalTime[n], the current picture is output.

Otherwise, if PictureOutputFlag is equal to 0, the current picture is not output, but will be stored in the DPB as specified in clause.

Otherwise (PictureOutputFlag is equal to 1 and DpbOutputTime[n] is greater than CpbRemovalTime[n]), the current picture is output later and will be stored in the DPB (as specified in clause) and is output at time DpbOutputTime[n] unless indicated not to be output by the decoding or inference of no_output_of_prior_pics_ flag equal to 1 at a time that precedes DpbOutputTime [n].

When output, the picture is cropped, using the conformance cropping window specified in the PPS for the picture.

In the same or another embodiment, PictureOutputFlag may be set as follows:

If one of the following conditions is true, PictureOutputFlag is set equal to 0:

the current picture is a RASL picture and NoIncorrectPicOutputFlag of the associated IRAP picture is equal to 1.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

vps_output_layer_mode is equal to 0 or 2 and OutputLayerFlag[GeneralLayerIdx[nuh_layer_id]] is equal to 0.

Otherwise, PictureOutputFlag is set equal to pic_output_ flag.

In the same or other embodiments, alternatively, PictureOutputFlag may be set as follows:

If one of the following conditions is true, PictureOutputFlag is set equal to 0:

the current picture is a RASL picture and NoIncorrectPicOutputFlag of the associated IRAP picture is equal to 1.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

vps_output_layer_mode is equal to 0 and the current access unit contains a picture that has PictureOutputFlag equal to 1, has nuh_layer_id nuhLid greater than that of the current picture, and belongs to an output layer (i.e., OutputLayerFlag[GeneralLayerIdx[nuhLid]] is equal to 1).

vps_output_layer_mode is equal to 2 and OutputLayerFlag[GeneralLayerIdx[nuh_layer_id]] is equal to 0.

Otherwise, PictureOutputFlag is set equal to pic_output_ flag.

In the same or other embodiments, a flag in VPS (or another parameter set) may indicate whether ILRP lists are signaled or not for the current slice (or picture). For example, referring to the example (800) in FIG. 8, an inter_layer_ref_pics_present_flag equal to 0 may specify that no ILRP is used for inter prediction of any coded picture in the CVS. inter_layer_ref_pics_flag equal to 1 may specify that ILRPs may be used for inter prediction of one or more coded pictures in the CVS.

In the same or other embodiments, the inter-layer reference picture (ILRP) list for a picture in the k-th layer may or may not be signaled, when the k-th layer is a dependent layer. Howerver, the ILRP list for a picture in the k-th layer shall not be signaled and any ILRP shall not be included in the reference picture list, when the k-th layer is an independent layer.

the value of inter_layer_ref_pics_present_flag may be set equal to 0, when sps_video_parameter_set_id is equal to 0, when nuh_layer_id is equal to 0, or when vps_independent_ layer_flag[GeneralLayerIdx[nuh_layer_id]] is equal to 1.

In the same or other embodiments, referring to the example (900) in FIG. 9, a set of syntax elements, which explicitly indicate the ILRP list, may be signalled in SPS, PPS, APS or slice header. The ILRP list may be used to construct the reference picture list of the current picture.

In the same or other embodiments, the ILRP list may be used to identify the active or inactive reference picture in a decoded picture buffer (DPB). The active reference picture may be used as a reference picture for decoding the current picture, while the inactive reference picture may not be used for decoding the current picture, but may be used for decoding the subsequent picture in decoding order.

In the same or another embodiment, the ILRP list may be used to identify which reference picture may be stored in DPB or may be outputted and removed from DPB. Those information may be used to operate the decoder based on the hypothetical reference decoder (HRD) model and parameters.

In the same or another embodiment, a syntax element ilrp_idc[listIdx][rplsIdx][i] may be signaled in VPS, SPS, PPS, APS or slice header. The syntax element ilrp_idc [listIdx][rplsIdx][i] specifies the index, to the list of directly dependent layers, of the ILRP of i-th entry in ref_pic_list_ struct (listIdx, rplsIdx) syntax structure to the list of directly dependent layers. The value of ilrp_idc[listIdx][rplsIdx][i] shall be in the range of 0 to theGeneralLayerIdx[nuh_layer_id]−1, inclusive.

In the same embodiment, the syntax element ilrp_idc [listIdx][rplsIdx][i] may be an index indicating an ILRP picture among directly dependent layers, which are identifed by vps_direct_dependency_flag[i][j] signalled in VPS. In this case, the value of ilrp_idc[listIdx][rplsIdx][i] shall be in the range of 0 to the NumDependentLayers[GeneralLayerIdx[nuh_layer_id]]−1, inclusive.

In the same embodiment, when the nuh_layer_id of the current layer is equal to k, it may be bit-efficient to signal an index indicating an ILRP among directly dependent layers, compared to signaling an index indicating an ILRP among all layers with nuh_layer_id smaller than k.

In the same or another embodiment, still referring to FIG. 9, the reference picture lists RefPicList[0] and RefPicList[1] may be constructed as follows:

```
for( i = 0; i < 2; i++ ) {
    for( j = 0, k = 0, pocBase = PicOrderCntVal; j < num_ref_entries[ i ][ RplsIdx[ i ] ];
j++) {
        if( !(inter_layer_ref_pic_flag[ i ][ RplsIdx[ i ] ][ j ] &&
GeneralLayerIdx[ nuh_layer_id ]) )
        {
            if( st_ref_pic_flag[ i ][ RplsIdx[ i ] ][ j ] ) {
                RefPicPocList[ i ][ j ] = pocBase − DeltaPocValSt[ i ][ RplsIdx[ i ] ][ j ]
                if( there is a reference picture picA in the DPB with the same nuh_layer_id as
the current picture
                    and PicOrderCntVal equal to RefPicPocList[ i ][ j ] )
                    RefPicList[ i ][ j ] = picA
                else
                    RefPicList[ i ][ j ] = "no reference picture"
            (−)
                pocBase = RefPicPocList[ i ][ j ]
            } else {
                if( !delta_poc_msb_cycle_lt[ i ][ k ] ) {
                    if( there is a reference picA in the DPB with the same nuh_layer_id as the
current picture and
                        PicOrderCntVal & ( MaxPicOrderCntLsb − 1 ) equal to
PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the
current picture and
                        PicOrderCntVal equal to FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx =
DirectDependentLayerIdx[ GeneralLayerIdx[ nuh_layer_id ] ][ ilrp_idc[ i ][ RplsIdx[ i ] ][
j ] ]
            refPicLayerId = vps_layer_id[ layerIdx ]
            if( there is a reference picture picA in the DPB with nuh_layer_id equal to
refPicLayerId and
                the same PicOrderCntVal as the current picture )
                RefPicList[ i ][ j ] = picA
            else
                RefPicList[ i ][ j ] = "no reference picture"
        }
    }
}
```

The techniques for signaling adaptive resolution parameters described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
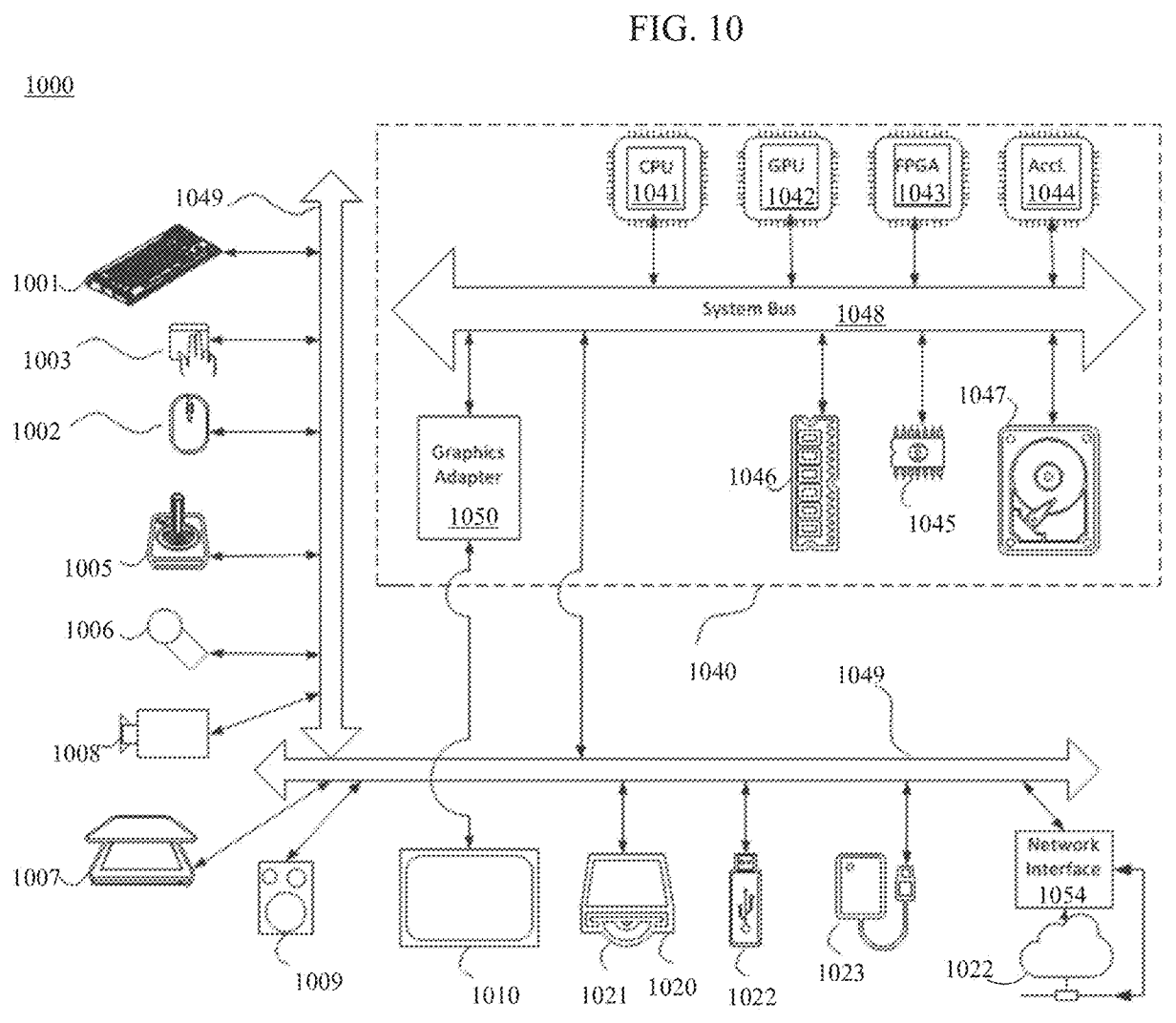

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding performed by at least one processor, the method comprising:

receiving a scalable bitstream including a first layer;

determining whether the first layer is a dependent layer of the scalable bitstream based at least in part on a syntax element from the scalable bitstream;

when the first layer is the dependent layer, decoding a picture in the dependent layer based on an inter-layer reference picture (ILRP) list, wherein a size of the ILRP corresponds to a number of direct reference layers indicated in the scalable bitstream; and when the first layer is not the dependent layer, decoding the picture in the first layer without using the ILRP list.

2. The method of claim 1, further comprising decoding a second picture that is in an independent layer by parsing and interpreting a reference picture list which does not include any decoded picture of another layer.

3. The method of claim 1, wherein the ILRP list includes a decoded picture of a different layer.

4. The method of claim 1, further comprising determining whether another syntax element indicates a maximum number of layers.

5. The method of claim 1, further comprising determining whether a parameter set of the scalable bitstream comprises a flag indicating whether a different layer in the scalable bitstream is a reference layer for at least one layer.

6. The method of claim 5, further comprising:

determining whether the flag indicates the different layer as the reference layer for the at least one layer by specifying an index of the different layer and an index of the at least one layer, and determining whether the parameter set comprises another syntax element indicating a value less than a determined number of dependent layers.

7. The method of claim 5, further comprising:

determining whether the flag indicates the different layer as not being the reference layer for the at least one layer by specifying an index of the different layer and an index of the at least one layer, and determining whether the parameter set comprises another syntax element indicating a value less than a determined number of dependent layers.

8. The method of claim 1, further comprising determining whether a parameter set of the scalable bitstream comprises a flag indicating whether a plurality of layers are to be decoded by interpreting the ILRP list.

9. The method of claim 1, further comprising determining whether a parameter set of the scalable bitstream comprises a flag indicating whether a plurality of layers are to be decoded without interpreting the ILRP list.

10. The method of claim 1, wherein the ILRP list is signaled with an inter-prediction reference picture (IPRP) list in the scalable bitstream.

11. A computing system, comprising:

control circuitry;

memory; and one or more sets of instructions stored in the memory and configured for execution by the control circuitry, the one or more sets of instructions comprising instructions for:

receiving video data;

for a first layer of the video data:

generating a syntax element indicating whether the first layer is a dependent layer;

when the first layer is the dependent layer, encoding a picture in the first layer using an inter-layer reference picture (ILRP) list, wherein a size of the ILRP corresponds to a number of direct reference layers in the video data; and when the first layer is not the dependent layer, encoding the picture in the first layer without using the ILRP list; and transmitting a scalable bitstream that includes the encoded picture and the syntax element.

12. The computing system of claim 11, wherein the one or more sets of instructions further comprise instructions for encoding a second picture that is in an independent layer without using a picture of a different layer.

13. The computing system of claim 11, wherein the ILRP includes a picture of a different layer.

14. The computing system of claim 11, wherein the one or more sets of instructions further comprise instructions for generating a second syntax element indicating whether a different layer is a reference layer for at least one layer.

15. The computing system of claim 11, wherein the ILRP list is signaled with an inter-prediction reference picture (IPRP) list in the scalable bitstream.

16. A non-transitory computer-readable storage medium storing one or more instructions and a video bitstream that is generated by a video encoding method, the one or more instructions when executed by a processor, cause a computing system to perform the video encoding method, wherein the video bitstream comprises coded information for a plurality of pictures of video data, including a first picture in a first layer of the video data, and a syntax element indicating whether the first layer of the video data is a dependent layer, and the video encoding method comprises, for the first layer of video data:

generating the syntax element;

when the first layer is the dependent layer, encoding the first picture in the first layer using an inter-layer reference picture (ILRP) list, wherein a size of the ILRP corresponds to a number of direct reference layers in the video data; and when the first layer is not the dependent layer, encoding the first picture in the first layer without using the ILRP list.

17. The non-transitory computer-readable storage medium of claim 16, wherein the video bitstream further comprises an encoded second picture in the independent layer, and wherein the encoded second picture is encoded without using a picture of a different layer.

18. The non-transitory computer-readable storage medium of claim 16, wherein the ILRP includes a picture of a different layer.

19. The non-transitory computer-readable storage medium of claim 16, wherein the video bitstream further comprises a second syntax element indicating whether a different layer in the video bitstream is a reference layer for at least one layer.

20. The non-transitory computer-readable storage medium of claim 16, wherein the ILRP list is signaled with an inter-prediction reference picture (IPRP) list in the video bitstream.

* * * * *